Feb. 26, 1924.

G. A. JULIUS.

TICKET ISSUING AND TOTALIZING DEVICE

Filed April 14, 1920    6 Sheets-Sheet 1

1,484,946

INVENTOR:
George A. Julius
By Wm Wallace White
ATTY.

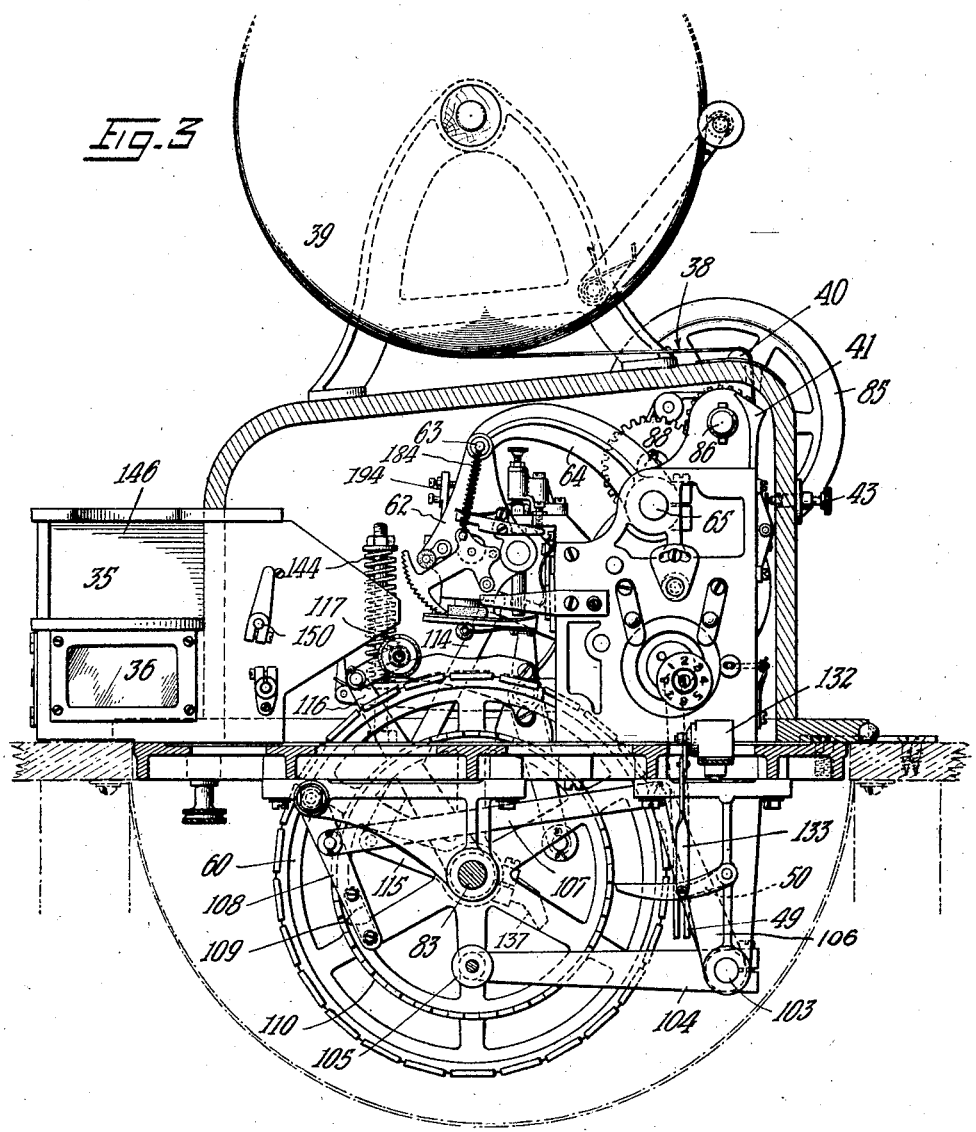

Feb. 26, 1924.
G. A. JULIUS
1,484,946
TICKET ISSUING AND TOTALIZING DEVICE
Filed April 14, 1920  6 Sheets-Sheet 3
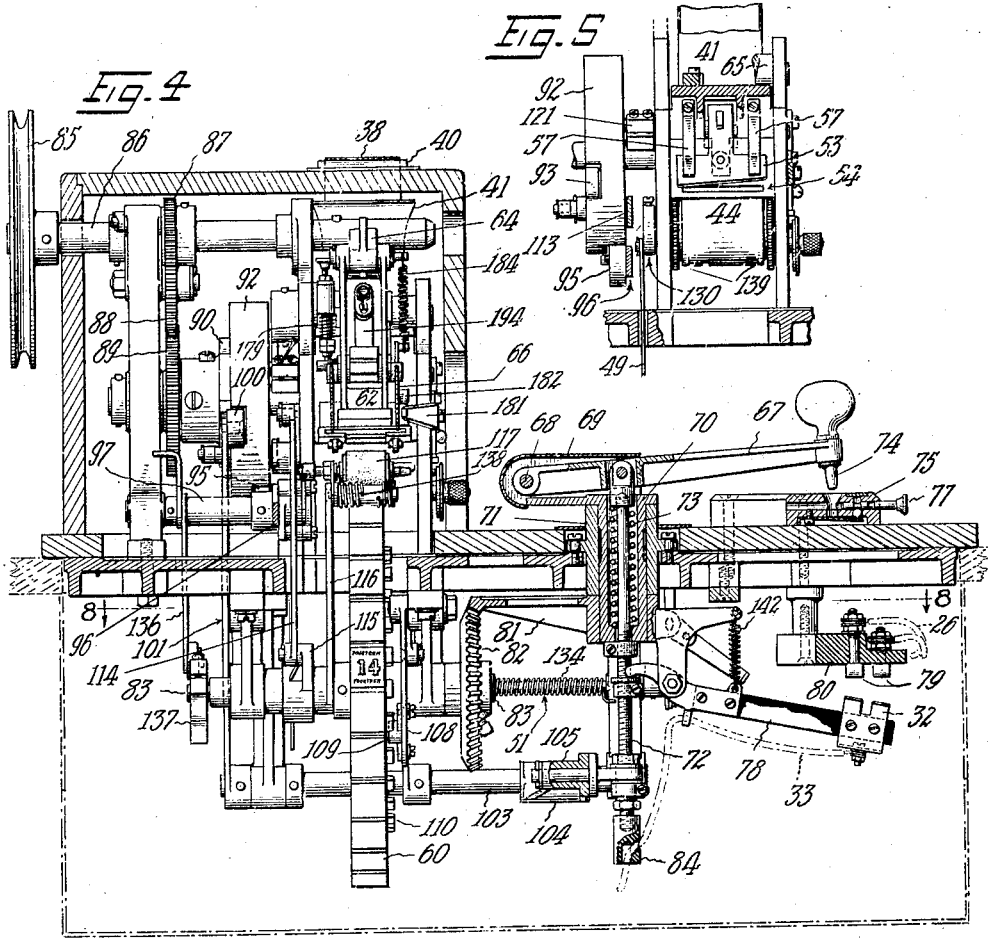
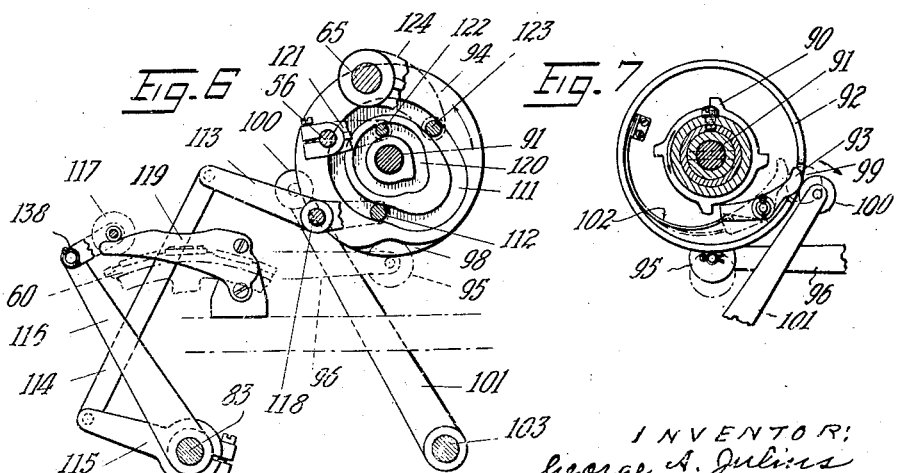
INVENTOR:
George A. Julius
By Wm Wallace White
ATTY.

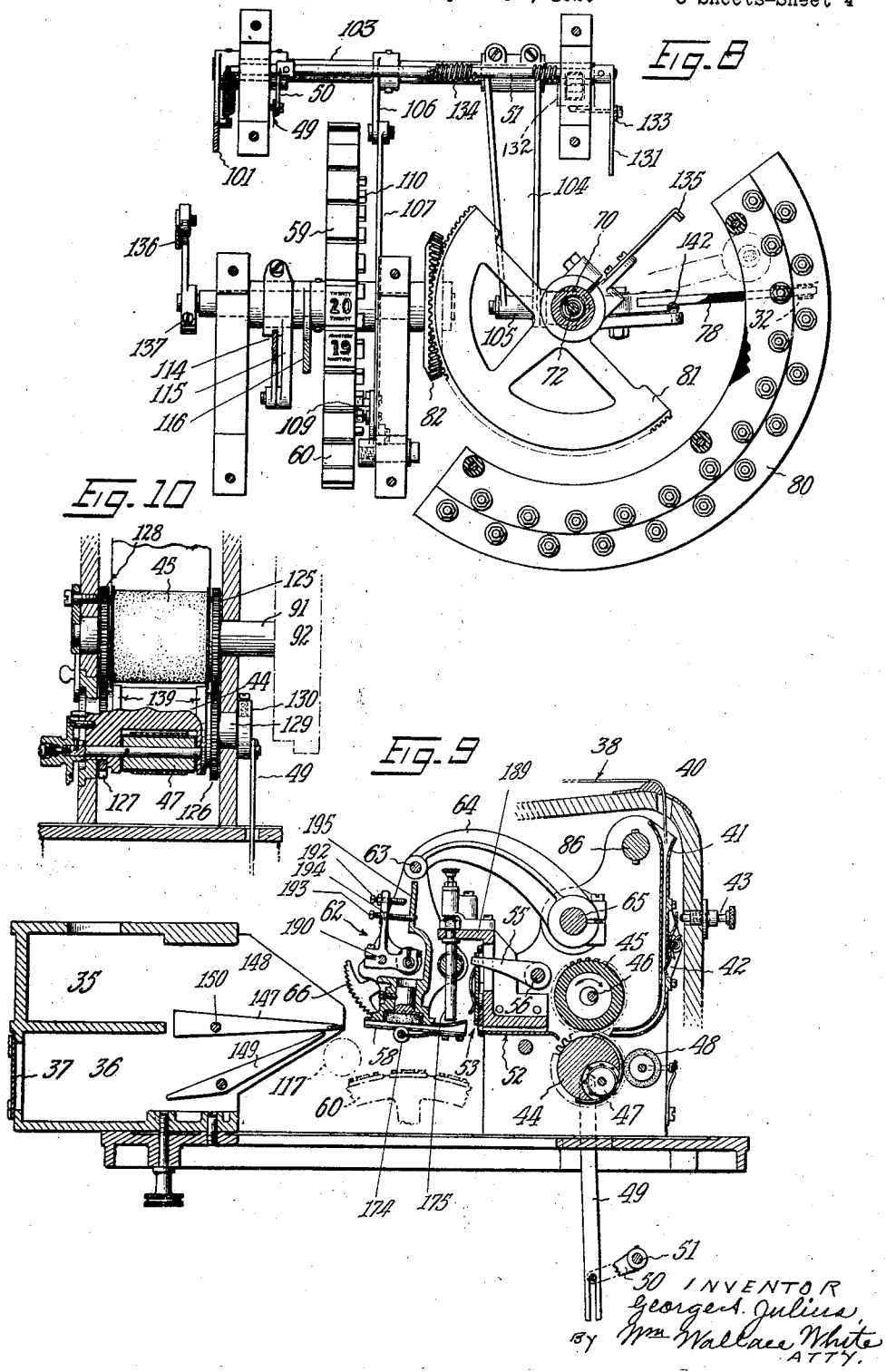

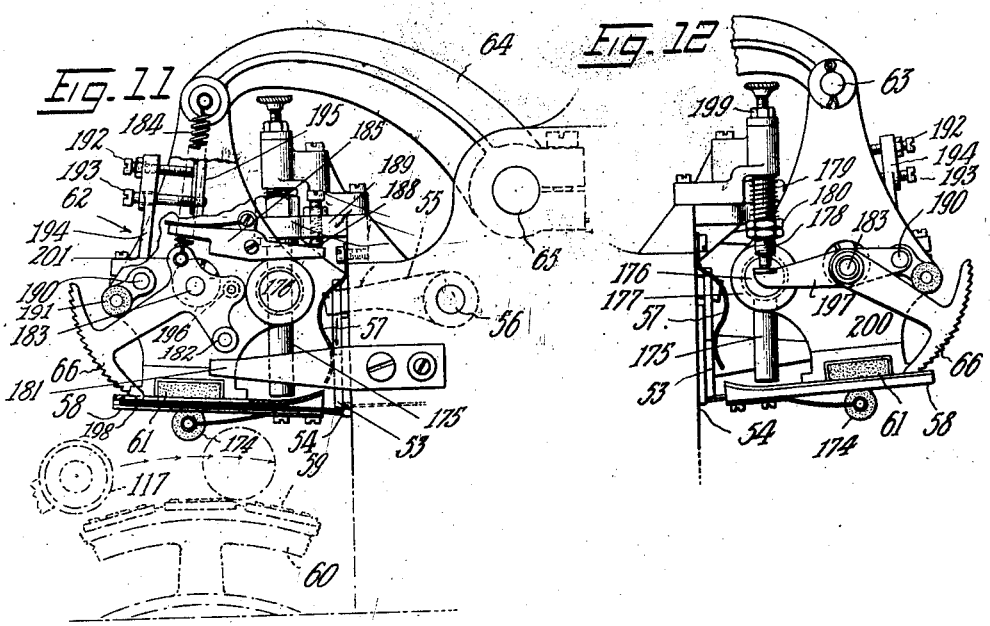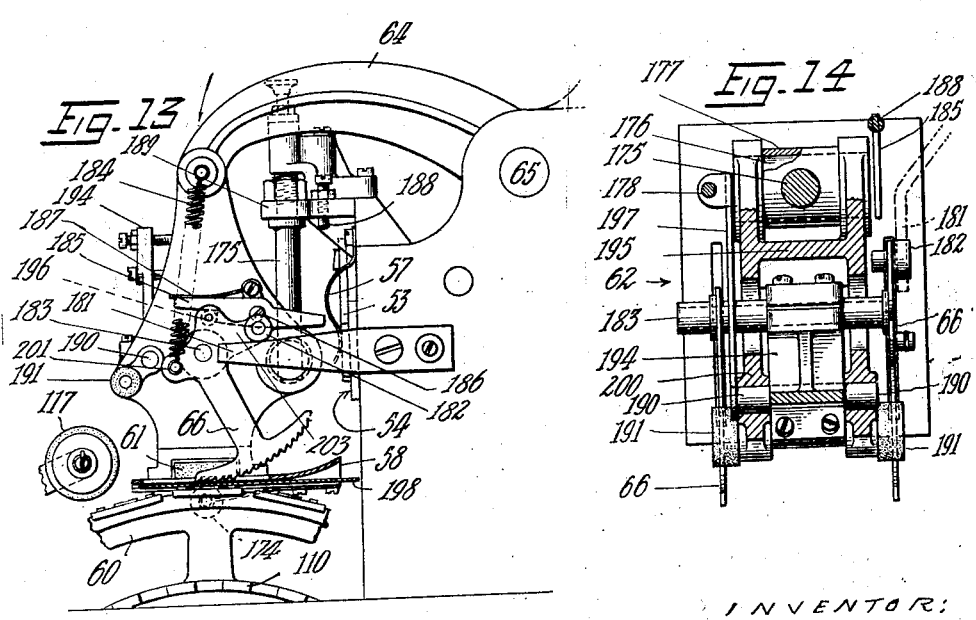

Feb. 26, 1924.

G. A. JULIUS 1,484,946

TICKET ISSUING AND TOTALIZING DEVICE

Filed April 14, 1920   6 Sheets-Sheet 6

INVENTOR:
George A. Julius
By Wm Wallace White
ATT'Y.

Patented Feb. 26, 1924.

1,484,946

UNITED STATES PATENT OFFICE.

GEORGE ALFRED JULIUS, OF SYDNEY, NEW SOUTH WALES, AUSTRALIA.

TICKET ISSUING AND TOTALIZING DEVICE.

Application filed April 14, 1920. Serial No. 373,726.

*To all whom it may concern:*

Be it known that I, GEORGE ALFRED JULIUS, of Sydney, New South Wales, Australia, subject of the King of Great Britain and Ireland, have invented new and useful Improvements in Ticket Issuing and Totalizing Devices, of which the following is a specification.

This invention relates to electro-mechanical apparatus manually controlled by a selector arm for printing totalizator tickets and for controlling through electrical means totalizator indicators by means of which the number, or the value totals of ticket issues, in separate classes and in gross, are recorded and displayed.

The apparatus is illustrated in the accompanying drawings, in which—

Fig. 3 is a longitudinal vertical section on line 3—3, Fig. 1. Certain of the control mechanism is omitted from this figure to facilitate display of other parts of the mechanism;

Fig. 4 is a transverse sectional elevation taken on the line 4—4, Fig. 1, certain parts being also omitted in this case to facilitate display of other parts;

Fig. 5 is a detail sectional view showing portion of the printing mechanism and the paper guillotine, these parts being omitted from Fig. 4;

Fig. 6 is a detail fragment elevational view showing the cam control for the indicating mechanism and other parts;

Fig. 7 is a fragment sectional elevation relating to the clutch mechanism which is located on the distant side of the cam member shown in Fig. 6;

Fig. 8 is a sectional plan taken on the line 8—8, Fig. 4, displaying portion of the control devices governed by the operation of the selector arm;

Fig. 9 is a longitudinal section taken on the line 9—9, Fig. 1, displaying the parts with a view to the explanation of the sequential operation of the feed, guillotine, printing, and ticket trapping devices;

Fig. 10 is a detail fragment sectional elevation showing the arrangement of the inset subsidiary printing roller in the main printing roller, this roller being provided for the purpose of altering identification letters, numbers, or marks for different series or classes of tickets;

Fig. 11 is an enlarged detail sectional elevation explanatory of the operation of the guillotine;

Fig. 12 is an elevational view of the parts shown in Fig. 11, as they appear at the opposite side of the machine;

Fig. 13 is a fragment sectional elevational view similar to Fig. 11, explanatory of the final printing operation and setting of the ticket ejector;

Fig. 14 is a horizontal section showing certain of the parts included in Fig. 11;

Figure 15:
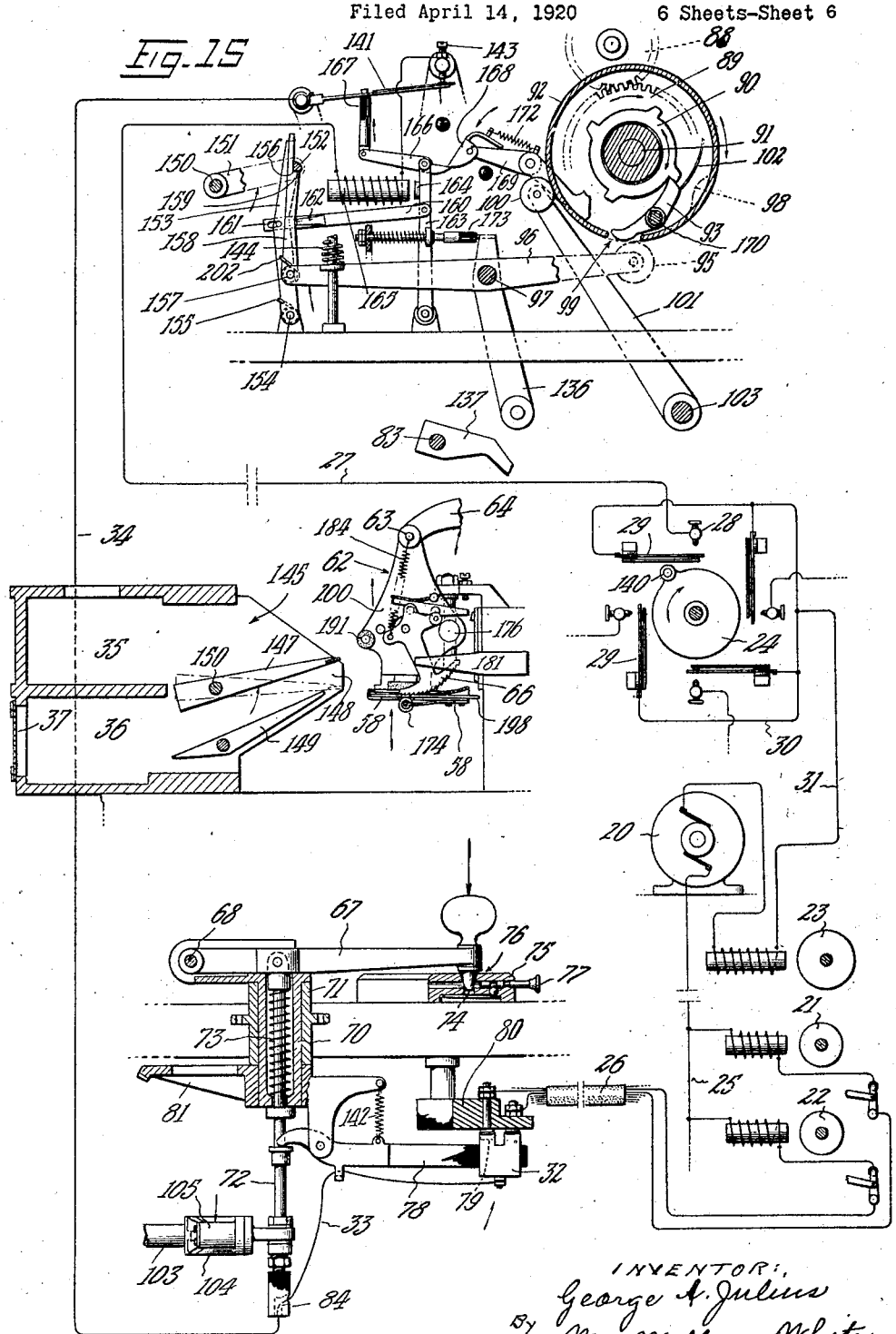
Fig. 15 is a diagrammatic view explanatory of the operation of the complete machine and its electrical connections to indicator apparatus in which the total of issues (or values of issues) of each class of ticket and of the aggregate of tickets issued are summed and indicated.

The circuit arrangement will be best understood on reference to Fig. 15. 20 represents an electric generator which provides the service current for the complete system, including the apparatus which forms the subject of the present invention, and in addition, also, the totalizator computing and indicating apparatus with which it is operatively associated.

For the sake of simplicity, only two horse indicators, 21 and 22, are shown, 23 being the grand total indicator, 24 is a rotary contact maker associated with the totalizator, and comprising a rotatable member carrying a tappet 140 arranged to close a number of contacts seriatim in each rotation. One such contact is provided to complete the circuit from each ticket printing and issuing machine, so that said machines will be brought separately into circuit momentarily with the totalizator elements. For this purpose the contact making blades, which are moved by the tappet action into contact with adjustable binding posts respectively wired to the ticket printing machines, are connected in multiple through the electro-magnetic elements of the grand total computor and indicator 23, and thence through the generator 20 and the multiple line 25 to the electromagnetic operating mechanisms in connection with the several horse indicators. When a circuit is closed through the rotary contact maker 24, the electro-magnetic operating devices in connection with the grand total computor and indicator 23 are caused to function simultaneously with the corresponding devices in that one of the horse indicators through which the circuit has been closed. 26 represents a length of cable carrying lines from each of the selector contacts in a ticket printing and issuing machine to the related horse total indicators 21—22, in appropriate order, and thence to the generator 20 and on to the grand total indicator 23.

When the selector arm in a ticket printing machine is plunged and the ticket printing and issuing elements are caused to operate, a contact is closed in that mechanism and is automatically held closed until the rotary contact maker 24 completes the circuit through the computing and indicating mechanisms already described, the current passing from the holding switch in the apparatus through the line 27 to the contact post 28 related to the particular printing machine until the tappet 140 closes the spring blade 29 against the post 28, and thereby completes the circuit momentarily through the multiple line 30, and thence by the line 31 through the grand total computor and indicator 23, the generator 20, the appropriate horse computor and indicator 21—22, a line in the cable 26, control switch 32, flexible line 33, and line 34 to the holding switch blade 141, the operation of which will be described with reference to the upper part of the figure.

Proceeding now to the nature and functions of the printing and issuing mechanisms—the strip 38 as drawn from the reel of paper 39 passes over a straightening beam 40, and thence goes through a flat guide tube 41, the upper end of which is bell mouthed. A pressure foot 42 acting through a gap in the back part of this tube presses against the paper strip and holds it under tension. The pressure foot may be retired for the purpose of inserting the end of a new reel by plunging in the tension control pin 43. From the lower bent end of the tube 41 the paper passes between the printing roller 44 and platen roller 45. These rollers are inter-geared so as to run with equal surface velocity, and the platen roller is mounted on an eccentric bearing 46 in order that the printing pressure may be justified. The printing roller 44 is formed with a pocket in which is mounted a subsidiary printing roller 47 which may be set to expose any of the printing faces thereon, these faces being allocated to different markings, as, for instance, "Race No. 1," "Race No. 2," so that the machines may be readily set after the conclusion of one race for the issuing of tickets on the next race, and so on. 48 is an inking roller which runs against the type faces on the rollers 44 and 47.

From the printing rollers the paper printed on one side passes through the guillotine guide 52 and under the guillotine knife 53. This knife is set angularly and is reciprocated against the face 54 of the guideway by means of an operating arm 55 on a rock spindle 56, this spindle receiving its movement, as will be hereinafter described, in timing with the operation of the other elements. The guillotine knife is held up to the working face by means of tongue springs 57. Before the guillotine knife operates, the printed length of paper has been moved forward into the cradle 58. In this cradle it is held along both edges, so that its under face is exposed in order that it may be met by the type face 59 on the printing wheel 60. It is held up by two small spring supported rollers 174, which project upwardly through gaps in the supporting edge ledges forming the under part of the cradle 58. 61 is a platen pad contained in the reciprocating carriage 62. Said carriage is mounted on a wrist pin 63 on the end of an oscillating carrier arm 64, which is mounted on a rock spindle 65, movement being applied to this spindle also in timing. The carriage 62 is fitted with ejector mechanism comprising serrated edged sector arms 66 fitted with controls by which said arms are held clear above the paper in the cradle during the setting movement of these arms 66. After the printing of the under side of the ticket has been effected, the printed length having been cut off by the guillotine, the arms 66 eject the ticket by a quick forward flipping movement, and deliver it into one or other chamber of the delivery box.

The printing wheel 60 is turned to bring the required printing block thereon into register with the platen 61 by means of gearing turned by the traverse of the selector arm 67. The selector arm is a lever mounted on a horizontal pivot pin 68 so that it may be plunged. The pivot pin 68 is carried in the bifurcated arm 69 of the sleeve 70, which is rotatably mounted in the vertical bearing 71 in the frame. The selector arm 67 carries a plunger spindle 72 and is normally held raised by a helical spring 73 contained in the tubular centre of the sleeve 70, so that said spring, when unrestrained, functions to hold the selector arm and the plunger spindle in the upper position, that is, with the selector pin 74 above the surface of the dial sector 75. The dial sector is pierced with a row of tracker holes 76, each of which is numbered to facilitate selection of the required hole, and each of them is fitted with a stop bolt 77, which, when pushed in prevents the selector pin from entering the hole. The operator, receiving a call for a ticket on a particular number representing the selected competitor traverses the selector arm 67 to bring it to register with the appropriate tracker hole, and then plunges the arm, thus bringing the selector pin into the selected hole below it. If the selected number refers to a competitor who has been withdrawn or scratched, the stop bolt will have been inserted and the plunging operation will be prevented, but if the bolt be drawn (see Fig. 4), a complete plunge may be made. In this plunging movement the control switch arm 78 is brought up to engage its blade 32 with the line contact 79 corresponding with the plunged hole. These contacts are arranged below the dialling sector on an insulated sector 80 in staggered order to economize lateral space. The bracket carrying the switch arm 78 is carried on a sector wheel 81 which is fixed to the sleeve 70. The weight of the arm 78 is entirely supported by the suspension spring 142. The sector wheel 81 gears with a bevel wheel 82, which is keyed on the spindle 83 which carries the printing wheel 60.

The blade of the control switch 32 is wired by a subsidiary insulated line 33, via a line 34, to the contact post of the holding switch 143. The flexible insulated line 33 is carried through a fair-lead insulated dead eye 84 fixed on the lower end of the plunger spindle 72. The one line serves to complete the circuit as required from any one of the contacts 79 of the control switch blade 32.

The primary drive is transmitted from a motor by means of a belt to the grooved pulley 85. This pulley is keyed to the primary shaft 86. A spur wheel 87 on the primary shaft 86 meshes with an idle spur 88, which in turn meshes with a spur gear 89. The last mentioned spur turns the four-toothed detent 90, and with said detent is freely rotatable on the carrier shaft 91. The clutch box 92 is pinned to the carrier shaft 91, and while the machine is in action is engaged with the constantly rotating four-toothed detent 90 by means of a floating spring-loaded pawl 93 which functions at each operation of the machine to engage the clutch box to the four-toothed detent for one complete rotation only. The face cam plate 94 is formed on or attached to the rear side of the clutch box 92. When, therefore, the clutch box suffers a rotation, the cams on the plate 94 perform a revolution and apply or permit one complete movement to the parts governed by it. The idle position is shown in Fig. 6, where the parts are shown brought to centre by the locating roller 95 which is carried on the end of a floating arm 96 which is fixed by a pin to a rocking spindle 97 and is held under tension by a helical spring 144. When the cam box is approaching the neutral or idle position, the bay 98 co-acts with the upwardly pressing locating roller 95 and the cam box comes to rest with said locating roller forced into the centre of the bay 98. The tail of the pawl 93 which is formed to project into the gap 99 formed in the edge of the clutch box is engaged by the locking roller 100 which is mounted on the top end of a rock-arm 101. In its idle position, the roller 100 throws the pawl into the position shown in the dotted line, so that its toe is moved out of engagement with the detent teeth. While the cam box is in rotation, however, the roller 100 runs on the face of said box and the toe of the pawl 93 is forced inward by the spring 102, as shown in the full lines in Fig. 7, where it will be engaged by the detent teeth as the detent wheel rotates, and will therefore function to lock the clutch box to the detent wheel and cause it to rotate therewith. Upon the completion of a rotation, the roller 100, again coming opposite the gap 99, acts against the tail of the pawl and withdraws it from engagement with the teeth of the detent wheel. The rocking arm 101 which carries the roller 100 is mounted on the rock shaft 103. The shaft 103 is rocked by means of an adjustable lever arm 104, the outer end of the said arm being eyed to a bracket pivot 105 which is carried on the plunger spindle 72 by means of a pinching collar and adjusting back nuts so that its vertical position may be adjusted with precision. When the selector arm is plunged, the arm 104 is rocked to apply a partial rotation to the rock shaft 103, which causes the arm 101 to swing outward, and thus release the pawl 93. Immediately after this release movement happens, the pawl is engaged by one or other of the teeth on the detent wheel, and the clutch box is rotated. While the clutch box is rotating, the roller 100, and consequently the arm 101, are held in the outward position, the rocking shaft 103 being thus turned through a small angle and the lever arm 104 thus forced downward, holding down the plunger spindle 72 and thereby locking down the selector arm 67 in the tracker hole 76 in which it has been plunged. The selector arm is not liberated so that it may be released from said tracker hole until the clutch box has completed a rotation and permitted the roller 100 to drop into the gap 99, thereby reversely rocking the shaft 103 and raising the lever arm 104, thus freeing the plunger 72 and permitting the spring 73 to raise the selector arm to the free position shown in Fig. 4. It is seen in the locked position in Fig. 15. The rock shaft 103 also carries another arm 106, which is connected at its outer end by a link 107 to a swinging lever 108. This lever carries a conical centering dowel 109 which is positioned to engage the teeth spaces 110 in the toothed crown on the side of the printing wheel 60. The tooth centerings in this crown are positioned in relation to the printing faces on the wheel 60 so that when the centering dowel 109 engages one of them the wheel is locked with a printing face in exact printing register below the platen 61. The rotational movement of the selector arm therefore functions to turn the printing wheel 60 to that position which brings the printing surface thereon corresponding with the selected tracker hole, into printing register with the platen 61 and sets the knife switch for engagement with the appropriate contacts corresponding with said tracker hole, and in its plunging movement it functions to permit the switch to be closed by the spring 142, and by means of the rock shaft 103 to engage the clutch and also to lock the printing wheel 60 in register.

When the clutch box is thus in rotation, the outer groove cam 111 operates through the runner 112 to rock the lever 113. The outer end of this lever is connected by a link 114 to the rock arm 115 which is adjustably secured on the hub portion of a swing arm 116, which carries the inking roller 117 for inking the face of the wheel 60. The hub portion of the swing arm 116 is freely rotatable on the spindle 83, and it therefore rocks with the rock lever 115 when said rock lever is moved by means of the cam connection already described, which operates to rock the lever 113 on its pivot centre 118.

The inking roller 117 is carried on an arm overhung from an arbor on the top end of the swing arm 116, and is forced down by a spring 138 on to the type face 59 of the wheel 60. A guide rail 119 is, however, provided to carry it clear of the wheel face except for a sufficient distance to effect the necessary inking of the presented printing face. This rail is joggled on the running face as shown in Fig. 6 for this purpose. As the cam performs a rotation, the inking roller is, by the mechanism described, caused to move inward, run over the presented printing face on the wheel 60, and then retire to the normal idle position shown in Fig. 6. The inner cam groove 120 is provided to apply rocking movement to the lever arm 121 by means of the runner 122. The arm 121 is adjustably fixed on the rock spindle 56 which carries the operating arm 55 which reciprocates the guillotine knife 53. The cam positions are located so that the necessary movements are thus applied to the inking roller and the guillotine knife in proper sequence with the mechanical operations of the other portions of the machine. In the outer cam groove 111 there also works a runner 123 carried on the end of the arm 124 which is fixed to the rock spindle 65. Upon this rock spindle is adjustably mounted the carrier arm 64 upon which the carriage containing the platen pad and ticket ejecting device is hung. The rocking movement of the rock spindle 65 operates to bring the carriage downward after the ticket length has been guillotined, thereby to bring the cut-off length of ticket into contact with the printing face 59 on the wheel 60, and in such movement to set the ejecting device, and in the return upward movement to effect, by the means hereinafter described, the release of the ejector so as to effect the ejecting of the printed ticket into the delivery box.

The motion of the paper through the machine is intermittent, that is to say, the paper does not run through its course uninterruptedly; it moves step by step in one-ticket lengths. The feed is effected by means of the printing and platen rollers 44 and 45 which move the paper, length by length, through the machine in timing with the operations of the guillotine, final printing, and ejecting devices.

The printing roller 44 is formed with two sector flange edges 139 which run in contact with the face of the platen roller 45. Intermediate the ends of these flanges, the face of the printing roller runs clear of the face of the platen roller. Feed is therefore applied to the paper only during that period of the rotation of the printing roller while the sector flanges 139 are running in contact with the face of the platen roller 45 and gripping the paper thereto. The positional relation of the sector flanges to the subsidiary roller will be seen in Fig. 9, in which the printing roller is shown in the position of rest. In this position the leading ends of the sector flanges are just touching the under face of the paper. As rotational movement of the printing and platen rollers occurs, advance movement is applied to the paper until the other end of the sector flange leaves the paper. Its underside is meantime printed by the plates fitted on the printing roller 44 between the sector flanges, and by the plates or type on the subsidiary printing roller 47. The idle period during which the paper is not advanced, that is, while the printing roller is completing the latter half of its rotation, occurs while the horse number is being printed, the ticket is being ejected, and the guillotine is in operation. During these operations it is necessary that the paper should be at rest.

Figure 1:
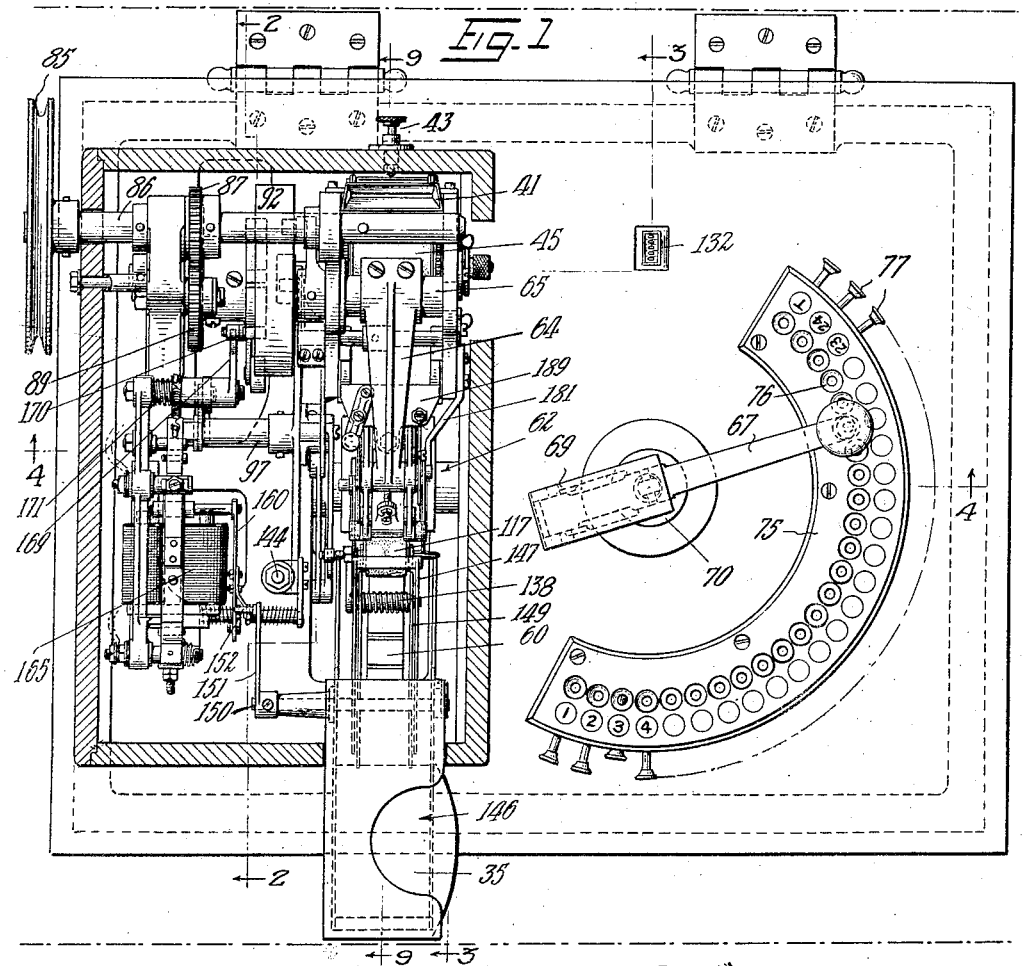
Fig. 1 is a top plan, with the casing which encloses the mechanism shown sectionally.

The rotation of the cam box turns the shaft 91 to which it is keyed. On this shaft a spur wheel 125 is keyed. This spur engages a spur 126 on the printing roller 44. The other side of the printing roller is geared by a spur wheel 127 to a spur wheel 128 located at the other end of the platen roller. This last mentioned spur turns the platen roller 45 at the same speed as the printing roller 44, the platen being otherwise freely rotatable on the shaft 91. The spindle 129 of the printing roller carries on its outer end an adjustable crank disc 130, the crank pin of which is connected by the forked pitman 49 to the rocking arm 50 which operates the machine counter 132. The operation of the counter is effected through the counter rocking arm 131, said arm being connected direct to the counter 132 by a link 133. The rock arm is mounted on a spindle 51 around which a helical spring 134 is coiled and exerts torsion on the spindle 51 tending always to turn it in the direction which will lift the counter rock arm 131. The outer end of this arm 131 is located so that when the selector arm is brought to the test position, marked "T" in Fig. 1, the check finger 135 fixed on the sleeve 70 will be brought directly above said arm end and will prevent the arm rising. It is thus provided that when a test ticket is printed, a record of the issue will not be effected by the counter 132.

There is no electrical connection from the contact 79 corresponding with the test position, as it is not required in the printing of a test ticket to establish the record of an issue in the totalizator mechanism. Means are therefore provided for effecting operation of mechanical elements of the printer in the absence of the electro-mechanical actions which normally take place when a contact is completed at 79 for the purposes of placing the printer in operation and effecting operation of the totalizator elements. This mechanical apparatus consists of a push lever 136 which may be freely rocked on the spindle 97. Movement is applied to this lever by the striker arm 137 which is positioned to engage a tappet roller on the end of said lever. This striker arm is adjustably mounted on the end of the spindle 83, and it engages said tappet and moves the lever to effect the operations hereinafter described when, and only when, the shaft has been rotated by the quadrant movement of the selector arm to the test position. At all other positions the striker arm is clear of the tappet roller, and the push lever remains idle.

The ticket trap contains an upper compartment 35 and a lower compartment 36. The trap is open at its end 145 opposite the ticket delivering device, and its upper compartment is formed also with a lateral opening 146 adapted for the withdrawal of issued tickets therefrom. The tickets as completed are delivered by the ejector mechanism into the compartment 35 whence they are taken by the sale clerk or the purchaser through the lateral opening 146. They are so delivered provided that the trap gate 147 is in the normal level position which is shown in Fig. 9; if it be raised into the tilted position shown in the full lines in Fig. 15, the delivered ticket is trapped under it and delivered into the lower compartment 36. The trap gate 147 is open in the centre in order to obviate air suckage which might affect the flight of tickets passing into the trap. Tickets received into the compartment 36 are withdrawable therefrom only when the clearing door 37 is unlocked and opened by an official. Tickets for which records have not been established at the totalizator, owing to failure of any part of the complete electrical circuit which traverses the printing machine and the totalizator, are discharged into this lower compartment as rejects. All normal tickets and test tickets are delivered into the upper compartment 35. A ticket cannot be delivered, therefore, until all the functions of the printing and issuing machine and also of the totalizator apparatus have been performed normally.

The gate 147 is operated automatically to set it in the full line position or the dotted line position respectively by mechanism which is operated either electrically or mechanically by means of the striker arm 137. The spindle 150 of the gate 147 is fitted with a lever arm 151 having an offset finger 152 upon it. 153 is an oscillating chock arm mounted on a pivot 154 and fitted with a coil spring 155 which operates to throw it forward. On its upper end is a check 156 adapted to engage the finger 152 when the arm 151 is raised to bring said finger above the level of the said check, and the spring 155 operates to push the arm normally forward, so that unless it be positively retired it will engage the finger 152 in said check. The floating arm 96 carries on a pivot 157 at its outer end a lift arm 158. This lift arm is formed with a check 159 also arranged to engage the finger 152, and a spring 202 operates to throw the arm 158 forward so that said check will engage said finger 152 unless the arm be positively held retired.

Figure 2:
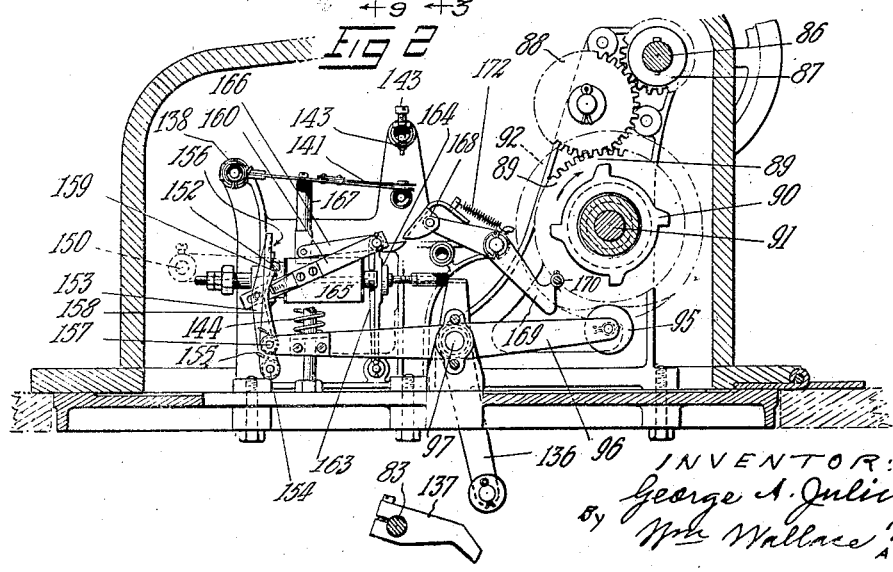
Fig. 2 is an end elevation at line 2—2, Fig. 1, showing certain portions in section.

As shown in Fig. 2, the floating arm 96 is in the idle position. At this point the roller 95 has fallen into the bay 98 of the surface cam and has consequently lowered its outer end, thus bringing down the lift arm 158 to the position shown in Fig. 2. In this position, the finger 152, and consequently the lever arm 151, is lowered, with the result that the trap tongue 147 is in the level (dotted line) position. When the clutch is engaged, the floating arm 96 is tilted, thereby bringing up the arm 158, which, acting through the check 159 on the finger 152, brings up the lever arm 151 and so throws the trap tongue 147 into the upper (full line) position shown in Fig. 15. On attaining this position the finger 152 is engaged also by the check in the oscillating chock arm 153, so that the trap tongue 147 is thus latched in the upper (full line) position and held there. If the finger 152 be released by the checks in the chock arm and the lift arm, the trap tongue 147 will fall to the level (dotted) position. This release of the finger 152 is effected by a trigger 160. The trigger is a light bar with a pin and slot connection 161 to the chock arm, and having an offset finger 162 adapted to engage the front of the lift arm 158. Its rear end is pivotally attached to an oscillating arm 163 which carries the armature 164 of an electro-magnet 165, the winding of said magnet being in series in the electrical circuit of the apparatus. The top end of the oscillating arm 163 carries pivotally upon it a rock lever 166, which through an insulating connector 167 supports the holding switch blade 141. In its upper position, this blade normally completes the circuit through the binding post contact 143. The rocking lever 166 is engaged at its power end by a spring-loaded latch finger 168 on the end of a trip lever 169, the inner end of which is engaged by an offset roller pin 170 which is an extension of the pivot which carries the spring-loaded pawl 93 in the clutch mechanism. In the idle position of the apparatus (see Fig. 2), the offset pin 170 forces the inner end of the trip lever 169 downward, setting above the nose of same as shown in Fig. 2, and thus holding the spring-loaded latch lever upward. 171 is a coiled spring which holds the latch lever 169 under tension, tending always to throw the latch 168 downwardly. The offset pin 170 acts against this spring to force the trip finger upward. 172 is a latch finger spring which functions to hold the latch finger outwards so that it may engage the rocking lever 166, but yet permit the latch finger to pass the end of said lever in its upward movement. When the latch finger is in the upper (Fig. 2) position, the contact at 141—143 is broken. Immediately the clutch comes into operation, the offset pin 170 is advanced by the rotation of the clutch box 92 and releases the inner end of the trip lever. The spring 171 then operates to throw the latch finger 168 downward, thereby tilting up the lever 166 and bringing the switch blade 141 into contact with the binding post 143, thus completing the electrical circuit through the apparatus when the associated contact of the rotary commutator 24 is closed. When that happens, the electro-magnet 165 is energized, with the result that the armature 164, and consequently the oscillating arm 163, are pulled inward, thus forcing the trigger 160 against the lifting arm 158 and the oscillating chock 153, releasing the offset finger 152 and permitting the trap tongue 147 to fall to the horizontal (dotted) position. At the same time, the end of the lever 166 is drawn from under the latch 168, and said lever and the switch blade 141 being no longer supported by the latch, the contact at 141—143 immediately opens. When the clutch box 92 has made one complete rotation, the offset pin 170 is brought into reengagement with the trip lever 169, thus restoring the parts to the Fig. 2 position. Thus it is provided that in the operation of the machine the contact 141—143 is closed immediately the clutch operation begins, and is broken automatically immediately the machine has been "tapped" through the rotary contact maker thereby to deliver an impulse of current through the system reaching the totalizator indicators and establishig there a record of the printing and issuing of a ticket, the record being established through the appropriate branch circuit as already described so as to operate the indicator of the particular horse on which the ticket has been issued, and also to operate the grand total indicator.

The circuit is held open mechanically independently of the electrical control effected through the electro-magnet 165, by means of the push lever 136 during the production of a "test" ticket. This lever acts against the oscillating arm 163 through a push rod 173 and mechanically forces said arm back, thus releasing the offset finger 152 and the lever arm 151, and so allowing the trap gate 147 to fall to its horizontal position.

The vertical movement of the carriage is guided by a fixed guide post 175 which runs through a trunnion pin 176 extending between its jaws, a thimble 177 being fitted to maintain the lateral position of the carriage in relation to the fixed guide post 175. The bracket which carries the guide post 175 also carries an adjustable stop plunger 178. This plunger is shown mounted with its extreme lower position fixed by a check nut fastening 199, but it may be moved upwardly in its support against a backing spring 179 when considerable force is applied to it. 180 are regulating nuts for adjusting the tension of the spring 179. 181 is a trigger arm fixed on the frame, extending outward to engage in a certain position a roller contact 182 offset from a kick arm 203 on one of the sector edged serrated faced ejector arms 66. These ejector arms are both fixed on a spindle 183. A pull arm 201 opposite the kick arm 203 is hung up by a tension spring 184 to the carrier arm 64 or to any fixed part on the carriage, said spring functioning to pull the sector arms forward from the position shown in Fig. 13 to the position shown in Fig. 11. 185 is a trigger pivotally mounted at 186 on the carriage and normally held downward by a leaf spring 187. The tail of this trigger is engaged by a release pin 188 which is fixed in the frame bracket 189 when the carriage is raised to the upper position. The spindle 183 is carried in a block 194 which is pivotally carried on a pin 190 which is fixed between the jaws 200 of the carriage, so that said spindle and the sector arms 66 thereon may be moved upwardly about said pin 190.

191 are buffer stops against which the arms of the sectors 66 contact in completing their extreme outward ejecting movement. The range of vertical movement of the spindle 183 is controlled by the limit check screws 192—193. The adjustment for this range of movement will be clearly understood on reference to Fig. 9. The rotation of the block 194 on the pin 190 tilts its upper bracket portion and the check screws 192—193 mounted thereon which respectively contact with and are screwed into the bridge portion of the carriage 195 to limit said movement in either direction. The operation of this part of the mechanism is as follows:—

When the carrier arm 64 is moved downwardly so as to lower the carriage towards the printing wheel 60, the offset roller 182 makes contact with the striker arm 181, forcing it up, while the spring 184 supports the pull arm 201 on the other side of the spindle 183. The spindle 183 is thus lifted, bringing up the sector arms clear of the cradle 58 so as to permit the ejector 66 to move backward without engaging and pushing the paper back out of the cradle 58. At this point the spindle 183 is lifted to its highest position relative to the carriage 200 and the lock 194 is tilted outward to the limit permitted by the adjustment of the screws 192-193, this outward tilting being permitted because, in the downward movement of the carriage the arm 197 leaves the end of the stop plunger 178. As the downward movement progresses, the sector arms are swung back to the rearward position (see Fig. 13) until the catch pin 196 is engaged by the notch in the trigger 185, the trigger being pressed down by its spring so as to engage said catch pin. The sector arms are held back by the engagement of the trigger as shown in Fig. 13 until positively released therefrom. When the carriage reaches its lowest position, the ticket 198 is printed against the presented type face 59 on the printing wheel 60, the platen 61 backing the ticket during this printing action. As the upward movement commences, the offset roller contact 182 leaves the striker arm 181, and the arms 66 then depend entirely upon the action of the trigger to hold them back in the position shown in Fig. 13, the spindle 183 being meantime in the upper position about the centre 190, where it is sustained by the spring 184. Just prior to the point at which the carriage 200 reaches its highest position, the arm 197 contacts with the end of the plunger 178. The spindle 183, and with it the arms 66, are thus forced downward until the serrated edges of the sectors dig into the edges of the ticket 198. Simultaneously the catch pin 196 is pushed free from the notch in the trigger 185. Thereupon, the spring 184 acts to apply a quick, forward, flipping movement to the ejector sector arms 66, bringing them from the position shown in Fig. 13 to that shown in Fig. 11. At this point the ticket 198 is opposite the mouth of the ticket trap, and according to the disposition of the trap tongue 147 will enter the upper compartment or the lower compartment thereof respectively. In the centre portion of Fig. 15 the position of the parts just before the ejecting movement takes place is shown. Assuming that the electrical circuits are in order, the trap gate 147 will have been lowered to the dotted position and when the sector arms 66 are snapped forward by the spring 184, the ticket is ejected into the upper compartment 35.

What I claim as my invention and desire to secure by Letters Patent is:—

1. In an apparatus of the class described, the combination of a rotatable printing wheel, reciprocable means cooperating therewith to print a ticket between said wheel and means, means for feeding a strip to be printed between said wheel and printing means, means for cutting off said strip, means for ejecting the printed ticket, a rotatable member having means for operating all of said means in proper sequence during one rotation of said member, a continuously rotating member adapted to engage said operating member thereby to rotate the same, a rotatable and reciprocable member, means for transmitting the rotary motion of said member to said printing wheel, and means operated during the reciprocatory motion of said member for causing engagement of the continuously rotating member with the operating member.

2. In an apparatus of the class described, the combination of a rotatable printing wheel, reciprocable means cooperating therewith to print a ticket between said wheel and means, means for feeding a strip to be printed between said wheel and printing means, means for cutting off said strip, means for ejecting the printed ticket, a rotatable member having means for operating all of said means in proper sequence during one rotation of said member, a continuously rotating member adapted to engage said operating member thereby to rotate the same, a rotatable and reciprocable member, means for transmitting the rotary motion of said member to said printing wheel, and means operated during the reciprocatory motion of said member in one direction for causing engagement of the continuously rotating member with the operating member, said last means being effective to prevent reciprocatory movement of said rotatable and reciprocable member in the opposite direction until one rotation of said operating member has been completed.

3. In an apparatus of the class described, the combination of a rotatable printing wheel having a plurality of printing faces, reciprocable means cooperating therewith to print a ticket between said wheel and means, means for feeding a strip to be printed between said wheel and reciprocable means, means for cutting off said strip, means for ejecting the printed ticket, a rotatable member having means for operating all of said means in proper sequence during one rotation of said member, a continuously rotating member adapted to engage said operating member thereby to rotate the same, a rotatable and reciprocable member, means for transmitting the rotary motion of said member to said printing wheel to bring one of its printing faces into printing position, means controlled by the reciprocatory motion of said member for locking the wheel in said position, and means also operated by said rotatable and reciprocable member during its reciprocatory motion for causing engagement of the continuously rotating member with the operating member.

4. In an apparatus of the class described, the combination of a preliminary printing mechanism, a rotatable printing wheel, reciprocable means cooperating with said printing wheel to print a ticket between said wheel and means, means carried by said preliminary printing mechanism for feeding a strip to be printed thereby and between said wheel and reciprocable means, means for cutting off said strip, means for ejecting the printed and cut-off ticket, a rotatable member having means for operating all of said means and said preliminary printing mechanism in proper sequence during one rotation of said member, a continuously rotating member adapted to engage said operating member thereby to rotate the same, a rotatable and reciprocable member, means for transmitting the rotary motion of said member to said printing wheel, and means operating during the reciprocatory motion of said member for causing engagement of the continuously rotating member with the operating member.

5. In an apparatus of the class described, the combination of a rotatable printing wheel, reciprocable means cooperating therewith to print a ticket between said wheel and means, means for feeding a strip to be printed between said wheel and reciprocable means, means for cutting off a printed ticket from said strip, means for ejecting the printed ticket, a rotatable member having means for operating all of said means in proper sequence during one rotation of said member, a continuously rotating member adapted to engage said operating member thereby to rotate the same, a rotatable and reciprocable member, means for transmitting the rotary motion of said member to said printing wheel, and means operated by said rotatable and reciprocable member during its reciprocatory motion for causing engagement of the continuously rotating member with the operating member, and means also actuated during the reciprocatory movement of said rotatable and reciprocable member for establishing a record of the printed ticket.

6. In an apparatus of the class described, the combination of a rotatable printing wheel, reciprocable means cooperating therewith to print a ticket between said wheel and means, means for feeding a strip to be printed between said wheel and reciprocable means, means for cutting off a printed ticket from said strip, means for ejecting the printed ticket, a rotating member having means for operating all of said means in proper sequence during one rotation of said member, a continuously rotating member adapted to engage said operating member thereby to rotate the same, a rotatable and reciprocable member, means for transmitting the rotary motion of said member to said printing wheel, means operated by said rotatable and reciprocable member during its reciprocatory motion for causing engagement of the continuously rotating member with the operating member, means actuated during the reciprocatory movement of said rotatable and reciprocable member for establishing a record of the printed ticket, means adjacent to the printing wheel for receiving the ejected tickets, and means also operative during the reciprocatory movement of said rotatable and reciprocable member for separating recorded tickets from unrecorded tickets.

In testimony whereof I have signed my name to this specification.

GEORGE ALFRED JULIUS.